S. MORSE.
IRON CAR BRAKE.

No. 10,004.

PATENTED SEPT. 6, 1853.

UNITED STATES PATENT OFFICE.

STEPHEN MORSE, OF SPRINGFIELD, MASSACHUSETTS.

IMPROVEMENT IN IRON CAR-BRAKES.

Specification forming part of Letters Patent No. 10,004, dated September 6, 1853.

*To all whom it may concern:*

Be it known that I, STEPHEN MORSE, of Springfield, county of Hampden, and State of Massachusetts, have invented or made certain new and useful Improvements in Car-Brakes; and I do hereby declare that the following is a full, clear, and exact description of the construction and operation of the same, reference being had to the annexed drawings, making a part of this specification, in which—

Figure 1:
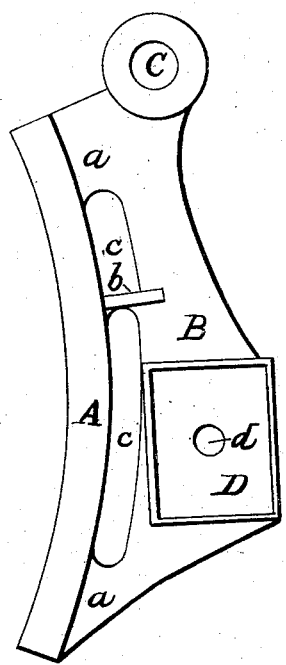
Figure 2:
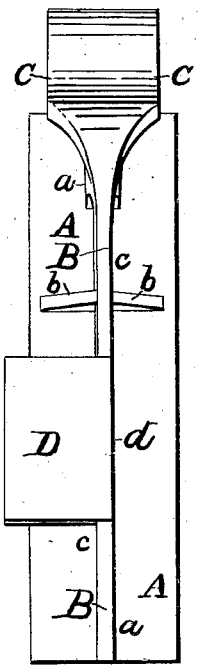

Figure 1 is a side elevation of the brake, and Fig. 2 an elevation of the rear of the same.

Where like letters occur like parts are thereby distinguished.

The nature of my invention consists in providing a brake of cast metal, constructed so that the friction-surface of the same will be worn off before impairing other portions, caused by the great heat generated when in operation; also, by constructing it in one solid mass, thereby dispensing with bolts and pins or other contrivances used for holding the parts together in other brakes; also, in placing the point of suspension in such position that the brake when relieved of pressure will disengage with the wheel by its own gravity, doing away thereby with springs or other reacting agents.

A in the drawings represents the concave friction-plate or rubber that plays against the wheel's tread-surface, connecting at the top and bottom *a a* and the center the brace-plates *b b*. On the back of the rubber A is the spine B, formed as light as possible in comparison to the part described.

*c c* are open spaces between the spine B and rubber A, extending near the entire surface of the back of the rubber, only interrupted by the connections *a a b b*.

In a line with top, running from the center from which the concavity of the rubber A is made and some distance in the rear of the same, I place the point of suspension C, consisting of an eye for the reception of the bolt in the timbers of the car, to which the brake is subtended. This eye is placed in the head of the spine B. Below this and about midway of the back of the rubber A is formed on the spine the socket D, into which, secured by a pin or bolt passed through the hole *d*, is received the end of the cross tie or timber passing from this brake to its fellow one on the opposite side of the car.

Having described the construction, the operation is as follows: The brake is forced in the usual way on the wheel upon which it acts, and by the friction of the two surfaces an immense amount of caloric is created, which in other brakes instantly traverses without impediment the whole mass, burning the parts prematurely and rendering them unsuitable for further use; but in this the great body of caloric remains in the heavy rubber or friction surface A and but comparatively a small portion passes to the spine B. Consequently the point of suspension and the timber end in the socket D remains in good condition, and the whole rubber A will in time wear away without a perceptible difference in the two parts C and D of the spine. When the brake is relieved from the pressure applied to force it against the wheel, it will fall back to its original position by its own gravity, thus dispensing with the spring used for that purpose in the common brakes.

Thus it will be seen the peculiar advantages derived from this mode of construction, by which I am enabled to produce a brake of a substantial character, less expensive, more durable, and less liable to get out of order than any other of which I am acquainted.

Having thus fully described my improved arrangement for brakes for cars or wherever it may be suitably applied, what I claim as new, and desire to secure by Letters Patent, is—

The spine B, having the point of suspension C and socket D, with the open spaces *c c* and brace-plates *b b*, in combination with the rubber or friction-surface plate A, substantially in the manner and for the purpose as herein set forth.

STEPHEN MORSE.

Witnesses:
LEM D. WILLIAMS,
B. K. MORSELL.